(12) United States Patent
Kiss et al.

(10) Patent No.: US 7,529,354 B2
(45) Date of Patent: May 5, 2009

(54) METHOD OF MANAGING A CONNECTION RELEASE, CORRESPONDING SYSTEM AND DEVICE

(75) Inventors: Krisztian Kiss, San Diego, CA (US); Markus Isomaki, Espoo (FI)

(73) Assignee: Nokia Corporation, Espoo (FI)

( * ) Notice: Subject to any disclaimer, the term of this patent is extended or adjusted under 35 U.S.C. 154(b) by 528 days.

(21) Appl. No.: 10/981,702

(22) Filed: Nov. 5, 2004

(65) Prior Publication Data
US 2006/0036741 A1    Feb. 16, 2006

Related U.S. Application Data

(60) Provisional application No. 60/599,915, filed on Aug. 10, 2004.

(51) Int. Cl.
*H04M 11/00*    (2006.01)
(52) U.S. Cl. .................................................. 379/93.01
(58) Field of Classification Search ............ 379/142.15, 379/142.17, 93.01
See application file for complete search history.

(56) References Cited

U.S. PATENT DOCUMENTS

| | | | |
|---|---|---|---|
| 2001/0021029 A1* | 9/2001 | Takaoka | 358/1.9 |
| 2002/0126821 A1* | 9/2002 | Barak et al. | 379/219 |
| 2003/0031159 A1 | 2/2003 | Sayeedi et al. | |

FOREIGN PATENT DOCUMENTS

EP    1 404 139 A1    3/2004

OTHER PUBLICATIONS

Schulzrinne H. et al. "The Reason Header Field for the Session Initiation Protocol (SIP)" Dec. 2002; pp. 1-9.
ETSI TS 124 229 V5.6.0 (Sep. 2003) Digital cellular telecommunications system (Phase 2+); Universal Mobile Telecommunications System (UMTS); Internet Protocol (IP) multimedia call control protocol based on Session Initiation Protocol (SIP) and Session Description Protocol (SDP); Stage 3 (3GPP TS 24.229 version 5.6.0 Release 5); 257 pages; Sep. 2003.
3$^{rd}$ Generation Partnership Project 2; 3GPP2 X.S0013-012-0 "Part 4 Update" 50 pages; Feb. 14, 2005.
3$^{rd}$ Generation Partnership Project 2; 3GPP2 X.S0013-004-A; "IP Multimedia Call Control Protocol Based on SIP and SDP Stage 3"; 312 pages; Dec. 2004.

(Continued)

*Primary Examiner*—Alexander Jamal
(74) *Attorney, Agent, or Firm*—Squire, Sanders & Dempsey L.L.P.

(57) ABSTRACT

The present invention relates to a method usable for managing a connection release of an established connection between two or more parties via a communication network. When the reason for terminating a connection/session between at least two parties is caused by circumstances in the communication network, such as a loss of bearer, this is detected in a first network element. Then the first network element generates a connection terminating message to be used in the connection release procedure into which a new information element is introduced indicating the reason for the connection release, for example the loss of bearer. This reason may be indicated to a user as an optional and additional information. Furthermore, a corresponding system, device and/or terminal equipment are proposed.

31 Claims, 6 Drawing Sheets

OTHER PUBLICATIONS

Schulzrinne, H. et al., "The Reason Header Field for the Session Initiation Protocol (SIP)"; pp. 1-8; Dec. 2002.

3rd Generation Partnership Project 2; Technical Specification Group Services and System Aspects; IP Multimedia Subsystem (IMS); Stage 2; 3GPP TS 23.228 V6.4.1; pp. 1-159; Jan. 2004.

Calhoun, P. et al., "Diameter Base Protocol"; pp. 1-147; Sep. 2003.

Durham, Ed D. et al., "The COPS (Common Open Policy Service) Protocol", pp. 1-38; Jan. 2000.

Rosenberg, J. et al. "SIP: Session Initiation Protocol"; pp. 1-269; Jun. 2002.

3rd Generation Partnership Project; Technical Specification Group Core Network; IP Multimedia Call Control Protocol based on Session Initiation Protocol (SIP) and Session Description Protocol (SDP) Stage 3; 3GPP TS 24.229 V6.1.0; pp. 1-266; Dec. 2003.

3rd Generation Partnership Project; Technical Specification Group Core Network; Policy Control Over Go Interface; 3GPP TS 29.207 V5.6.0; pp. 1-57; Dec. 2003.

3rd Generation Partnership Project; Technical Specification Group Core Network; Policy Control Over Gq Interface; 3GPP TS 29.209 V1.0.0; pp. 1-23; May 2004.

* cited by examiner

METHOD OF MANAGING A CONNECTION RELEASE, CORRESPONDING SYSTEM AND DEVICE

REFERENCE TO RELATED APPLICATIONS

This application claims priority of U.S. Provisional Application No. 60/599,915, filed on Aug. 10, 2004. The subject matter of this earlier filed application is hereby incorporated by reference.

BACKGROUND OF THE INVENTION

1. Field of the Invention

The present invention relates to a method and/or a system and/or a device and/or a terminal equipment usable for a mechanism for managing/controlling at least one connection between two or more parties via a communication network. In particular, the present invention relates a method and/or a system and/or a device and/or a terminal equipment usable for a mechanism for managing/controlling at a connection in a case where an established connection is to be terminated.

2. Related Prior Art

In the last years, an increasingly extension of communication networks, e.g. of wire based communication networks, such as the Integrated Services Digital Network (ISDN), or wireless communication networks, such as the cdma2000 (code division multiple access) system, cellular $3^{rd}$ generation communication networks like the Universal Mobile Telecommunications System (UMTS), the General Packet Radio System (GPRS), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the user equipment and is connected via an interface to a corresponding core or backbone network subsystem. The core (or backbone) network subsystem switches the data transmitted via the communication connection to a destination party, such as another user equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the user equipment and another user terminal, a database, a server, etc., one or more intermediate network elements such as control network elements, support nodes or service nodes are involved. One or more connection parameters are used for defining connection characteristics. This includes, for example, a packet based data transmission protocol information, such as a PDP (Packet Data Protocol) context information, information about quality of service (QoS) requested or provided, charging-related information, such as a charging class, etc.

On the other hand, regarding the end of a connection, an established communication connection may be terminated by different reasons. For example, one of the parties may end the connection. However, it may also be the case that the communication connection is terminated due to network related reasons. This includes, for example, a deterioration of the connection quality resulting in a loss of bearer for one terminal equipment of the participating parties, or the like.

In case of a network related reason for terminating a connection, there are proposed several methods in different communication network types how this connection termination is to be handled.

As a first example, a conventional method for terminating a connection in a 3GPP Internet Protocol (IP) Multimedia System (IMS) Release 6 environment is described.

In general, IMS enables the provision of multimedia services. IP multimedia services are based on an IETF defined session control capability which, along with multimedia bearers, utilizes an IP-Connectivity Access Network. The IMS, in particular the Core Network (CN) subsystem thereof, enables the convergence of, and access to, voice, video, messaging, data and web-based technologies for the wireless user. An overview of IMS is provided, for example, in 3GPP TS 23.228 V.6.4.1 (2004-01).

The IMS utilizes different types of network elements which include, amongst others: a Policy Decision Function (PDF) acting as a policy decision element for service based local policy control, which makes policy decisions on the basis of session and media related information; one or more Application Functions (AF) being elements offering applications that require the control of IP bearer resources, such as UMTS PS resources, GPRS domain resources; a Proxy Call Session Control Function (P-CSCF) element as a session management element which represents one example for an AF, and which is acting a proxy, i.e. it accepts requests and services them internally or forwards the; a Gateway GPRS Support Node (GGSN) for sending requests and receiving decisions from the PDF. The network elements are connected by specified interfaces, such as a Go interface between the GGSN and the PDF, a Gq interface between the PDF and the P-CSCF (in case of 3GPP IMS rel. 6, for example), and the like. It is to be noted that, as known by those skilled in the art, also other network elements and interfaces are used within the IMS system, like other CSCFs, such as a Serving-CSCF, an Interrogating-CSCF, and the like. However, as such elements are not of significant importance for the present invention, a detailed description thereof is omitted herein.

In order to achieve access independence and to maintain a smooth interoperation with wireline terminals across the Internet, the IMS attempts to be conformant to IETF "Internet standards". Therefore, the interfaces specified conform as far as possible to IETF "Internet standards" for the cases where an IETF protocol has been selected, e.g. Session Initiated Protocol (SIP). SIP is an application-layer control protocol for establishing, modifying and terminating multimedia sessions, such as Internet telephony calls, and is defined, for example, in IETF RFC (Request for Comments) 3261 (June 2002).

Regarding the termination of a connection or session of a party/user in an 3GPP IMS rel. 6 environment, as described for example in 3GPP specification TS 24.229 V.6.1.0 (December 2003), the P-CSCF has to release all dialogs associated with the served user, when it receives an indication that the radio interface resources are no longer available for a served user (e.g. in case of a loss of bearer). The indication is received on the Gq interface from the PDF according to the procedures described in 3GPP specification TS 29.209 V.1.0.0 (May 2004). The Gq interface is used for service based policy set-up information exchange between the PDF and the AF. At the Gq interface, Diameter base protocol as defined in IETF RFC 3588 (September 2003) is used. The Diameter base protocol provides an Authentication, Authorization and Accounting (AAA) framework for applications such as network access or IP mobility. According to TS 29.209, when the GGSN informs the PDF of the PDP context release (via Go interface by using Common Open Policy Service protocol (COPS) signalling, defined below), the PDF informs the AF (like the P-CSCF) about this event by sending an Abort-Session-Request (ASR) message with the appropriate Session-Abort-Cause Attribute Value Pair (AVP) value. The ASR command, indicated by a Command-Code field set to a value of 274, for example, and a so-called "R" bit set in the Command Flags field, is sent by the PDF to inform the AF that bearer resources for the authorized session are not available (anymore).

It is to be noted that a similar mechanism is also defined for a 3GPP2 MultiMedia Domain (MMD) environment, and a description of the implementation of an IP multimedia call control protocol used in such a 3GPP2 MMD environment is provided in the 3GPP2 specification X.S0013.4. In 3GPP2 MMD networks the gateway node is a Packet Data Serving Node (PDSN) instead of a GGSN according to 3GPP IMS.

Next, another example for a conventional method for terminating a connection in a 3GPP IMS Release 5 environment is described.

In 3GPP Release 5, different to the IMS 3GPP rel. 6 system, the PDF may be part of the P-CSCF. In this case, the GGSN is connected to the P-CSCF/PDF entity via the Go interface. The policy control mechanism in the 3GPP IMS rel. 5 environment is described, for example, in the 3GPP specification TS 29.207 V.5.6.0 (December 2003).

Similar to the mechanism described in connection with the 3GPP IMS rel. 6, the P-CSCF has to release all dialogs associated with the served user when it receives an indication that the radio interface resources are no longer available for a served user (e.g. in case of a loss of bearer). According to TS 29.207, the indication is received via the Go interface from the PDF. The GGSN informs the PDF of the bearer release related to the SIP session of the served party by sending a Common Open Policy Service protocol (COPS) Delete Request State (DRQ) message. COPS is a protocol developed for use between a policy server and a network element, and is described, for example, in IETF RFC 2748 (January 2000).

In both the 3GPP IMS rel. 6 and rel. 5 environments, in reaction to the receipt of the indication, the P-CSCF performs a dialog release procedure. Releasing dialogs means for the P-CSCF to generate a (SIP) BYE request based on the information saved for the related dialog/connection during dialog/connection establishment between the parties which is transmitted to the served party by means of a SIP signalling.

However, when the party, i.e. the user equipment, receives the BYE request generated by the P-CSCF, the user using the UE to receive does not get any indication about the reason caused to send the BYE request, i.e. why exactly the connection is terminated. This may lead to an impression of the user that the BYE request is sent by the other party's terminal. In other words, a user is not in the position to recognize why the call was released. He can easily assume that the called party hung up although the reason was actually in bad quality of radio interface (loss of bearer). A "called party" can also be any service in the network which an end user is using. In this case a user could hold the view that the problem was in the service even though the reason for the release was in bearer.

SUMMARY OF THE INVENTION

Thus, it is an object of the invention to provide a mechanism for managing and controlling a connection in such a way that the reason for releasing the connection can become apparent for a user of a party of the released connection.

In particular, it is desirable to provide a mechanism allowing to inform a user about the originating point of a connection release or session termination request so that it is possible to provide information to a user allowing to discriminate network generated and other party generated session termination.

This object is achieved by the measures defined in the attached claims.

In particular, according to one aspect of the proposed solution, there is provided, for example, a method of managing at least one connection between two or more parties via a communication network, wherein in the case that an established connection is to be released, the method comprising the steps of determining, in a first network element, an unavailability of resources for the established connection of a party, generating, in the first network element, a connection terminating message to be sent to at least one of the parties, wherein the connection terminating message is provided with an information element indicating the reason for the connection release.

Furthermore, according to one aspect of the proposed solution, there is provided, for example, a system for managing at least one connection between two or more parties via a communication network, the system comprising: a first network element including determining means for determining an unavailability of resources for an established connection of a party resulting in a release of the established connection, and generating means for generating a connection terminating message to be sent to at least one of the parties, wherein the generating means provides the connection terminating message with an information element indicating the reason for the connection release.

Moreover, according to one aspect of the proposed solution, there is provided, for example, a device usable in the management of at least one connection between two or more parties via a communication network, the device being part of a first network element and comprising: determining means for determining an unavailability of resources for an established connection of a party resulting in a release of the established connection, and generating means for generating a connection terminating message to be sent to at least one of the parties, wherein the generating means provides the connection terminating message with an information element indicating the reason for the connection release.

Additionally, according to one aspect of the proposed solution, there is provided, for example, a terminal equipment used in a connection between two or more parties, the terminal equipment comprising receiving means for receiving a connection terminating message, processing means for processing the connection terminating message and for deriving, from an information element included in the connection terminating message, a reason the connection release.

According to further refinements, the proposed solution may comprise one or more of the following features:
the determination may further comprise receiving, from a second network element, an indication for the release of the established connection, and recognizing from the indication received from the second network element an information regarding the unavailability of resources, wherein this information is used for deriving the reason for the connection release;

the generation of the connection terminating message may further comprise the introduction of a reason header field as the information element indicating the reason for the connection release into the connection terminating message;

the reason header field may comprise a protocol information portion and a text portion identifying the reason of unavailability of resources;

the two or more parties may comprise one or more user terminals, and/or one or more services provided by the communication network;

the first network element may comprise a session management network element, while the second network element may comprise a policy decision network element;

then, from the second network element, the indication for the release of the established connection may be transmitted by means of a Diameter protocol signaling;

alternatively, the first network element may comprise a session management portion and a policy decision portion, while the second network element may comprise a communication control or gateway support network element;

then, from the second network element, the indication for the release of the established connection may be transmitted to the first network element by means of a COPS protocol signaling;

the unavailability of resources for the established connection may be based, for example, on a bearer loss for the established connection;

the connection terminating message may be transmitted to a terminal equipment of at least one of the parties, and, in the terminal equipment, the connection terminating message may be processed;

the processing may further comprise deriving from the information element provided in the connection terminating message the reason for the connection release, and displaying to a user of the terminal equipment the derived reason for the connection release;

the terminal equipment may comprise means for informing the user of the terminal equipment about the reason for the connection release supplied by the processing means, wherein the means for informing the user may comprise display means for displaying an information indicating the reason for the connection release;

the processing means in the terminal equipment may use a protocol information portion and/or a text portion identifying the reason for the connection release in the information element for deriving the reason for the connection release.

By virtue of the proposed solutions, the following advantages can be achieved:

The proposed mechanism is easy to implement in future networks and already existing networks by introducing an information element into a connection terminating message to be sent to the served party. Changes in the network structure or procedures are only necessary at the core network side. Additionally, this information element is "uncritical" for the further processing of the connection terminating message as it can be ignored by the receiving party in case that this party is not capable of processing or understanding the message or its content, or when it is unnecessary to understand the content, for example in case the receiving party is not a user terminal.

Furthermore, the message and its content can be processed in different ways. One possibility is to simply copy the text content portion and to use it for informing the user. Another possibility is that the receiving party's terminal is able to process the protocol information portion of the reason header and to execute a predetermined processing such as displaying an appropriate information to the user informing him about the release reason. Moreover, the terminal manufacturer, a vendor and/or the network provider may decide whether to execute the processing of any information derived from the reason header or to display any corresponding information.

With this feature implemented in terminals, a user can differentiate call/session releases caused by bad bearer quality from other call releases.

The above and still further objects, features and advantages of the invention will become more apparent upon referring to the description and the accompanying drawings.

DESCRIPTION OF PREFERRED EMBODIMENTS

Figure 1:
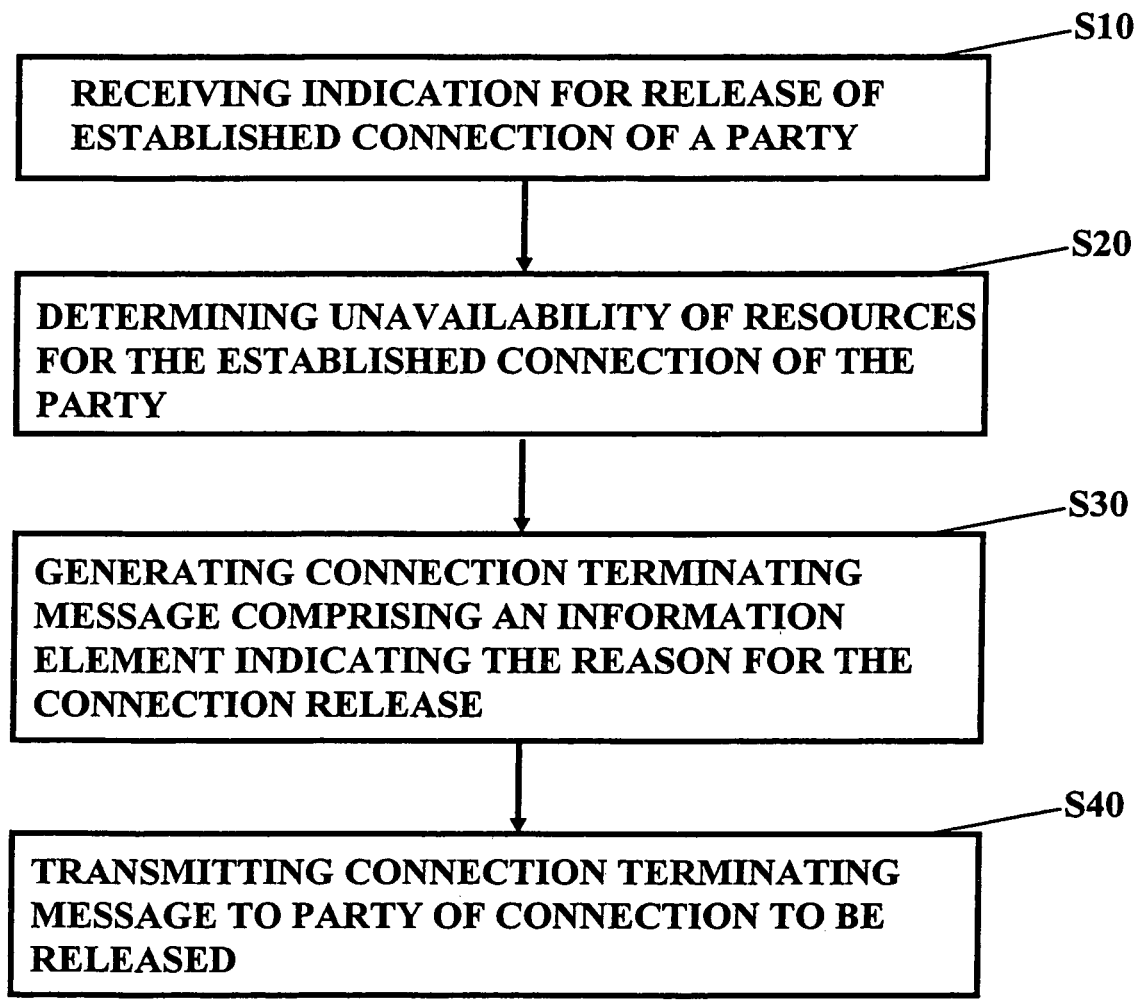
FIG. 1 shows a flow chart of method of managing a connection release.

In general, the mechanism proposed in the present invention is based on a concept in which a reason for terminating a connection/session between at least two parties caused by circumstances in the communication network (such as a loss of bearer) is detected in a session management network element, and the session management network element is adapted to introduce a new information element into a connection terminating massage to be sent to the served party during the connection termination procedure which indicates the reason for the connection release, for example the loss of bearer. This reason may be indicated to a user as an optional and additional information.

In the 3GPP IMS rel. 6 and rel. 5 environments using SIP signaling to the user equipment, the information element to be introduced by the P-CSCF as the session management network element into the SIP BYE message as the connection terminating message is based, for example, on a reason header field which is defined in IETF RFC 3326 (December 2002). By means of such a reason header field, the information concerning the reason for the release can be conveyed to the user equipment as one party of the communication connection.

As mentioned above, the connection control or management mechanism according to the present invention is useful in a case where an established connection between at least two parties is to be terminated due to a network caused reason. The at least two parties, such as user equipments, application function services or the like, may be located in different communication networks or PLMN (Public Land Mobile Network) or within the same communication network, such as ADSL, UMTS, GPRS, WLAN, or the like, wherein the communication networks of the respective parties may be, but does not need to be of different types.

The respective party's equipment may also be a terminal apparatus of different type. For example, the UE may be a mobile or fixed phone, a personal computer, a server, a mobile laptop computer, a personal digital assistant (PDA) or the like. Irrespective of its specific type, the party's equipment may comprise several means which are required for its communication functionality. Such means are for example a processor unit for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, data interface means, and the like), user interface means for providing monitor and manipulation possibilities to a user (e.g. a screen, a keyboard, a microphone and headset for communication, and the like), and network interface means for establishing a communication connection under the control of the processor unit (e.g. wired or wireless interface means, an antenna, and the like). These means can be integrated within one device (e.g. in case of a mobile or fixed telephone) or in several devices forming the user equipment (e.g. in case of a laptop).

A communication connection is usually established between the parties via several network elements. This is effected, for example, by sending a communication connection request signaling for at least one service type which is desired to be used in the communication connection to the communication network to which the first UE is connected. More specifically the first UE (network element) performs a communication connection activation by sending, for example, a (primary) packet based data transmission protocol context, such as a Packet Data Protocol (PDP) context, request via an access network subsystem of the connected communication network to the core network subsystem of the connected communication network. The structures of the access network subsystem and core network subsystem depend on the respective communication network type. For existing system, these structures are commonly known for a person skilled in the art. In case of a 3GPP network system, for example, a UMTS Terrestrial Radio Access Network (UTRAN) and/or a GSM/EDGE Radio Access Network (GERAN) on the access network subsystem side as well as a Serving GPRS Support Node SGSN, a Home Location Register HLR, a Gateway GPRS Support Node GGSN and the like on the core network subsystem side may be involved.

The network elements used as the first and the second network element, such as the GGSN, the PDF, the P-CSCF may be implemented by software or by hardware. In any case, for executing their respective functions, correspondingly used devices or network elements comprise several means which are required for control and communication functionality. Such means are, for example, a processor unit for executing instructions and processing data (for example, transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), and interface means for establishing a communication connection under the control of the processor unit (e.g. wired and wireless interface means, an antenna, and the like).

Figure 6:
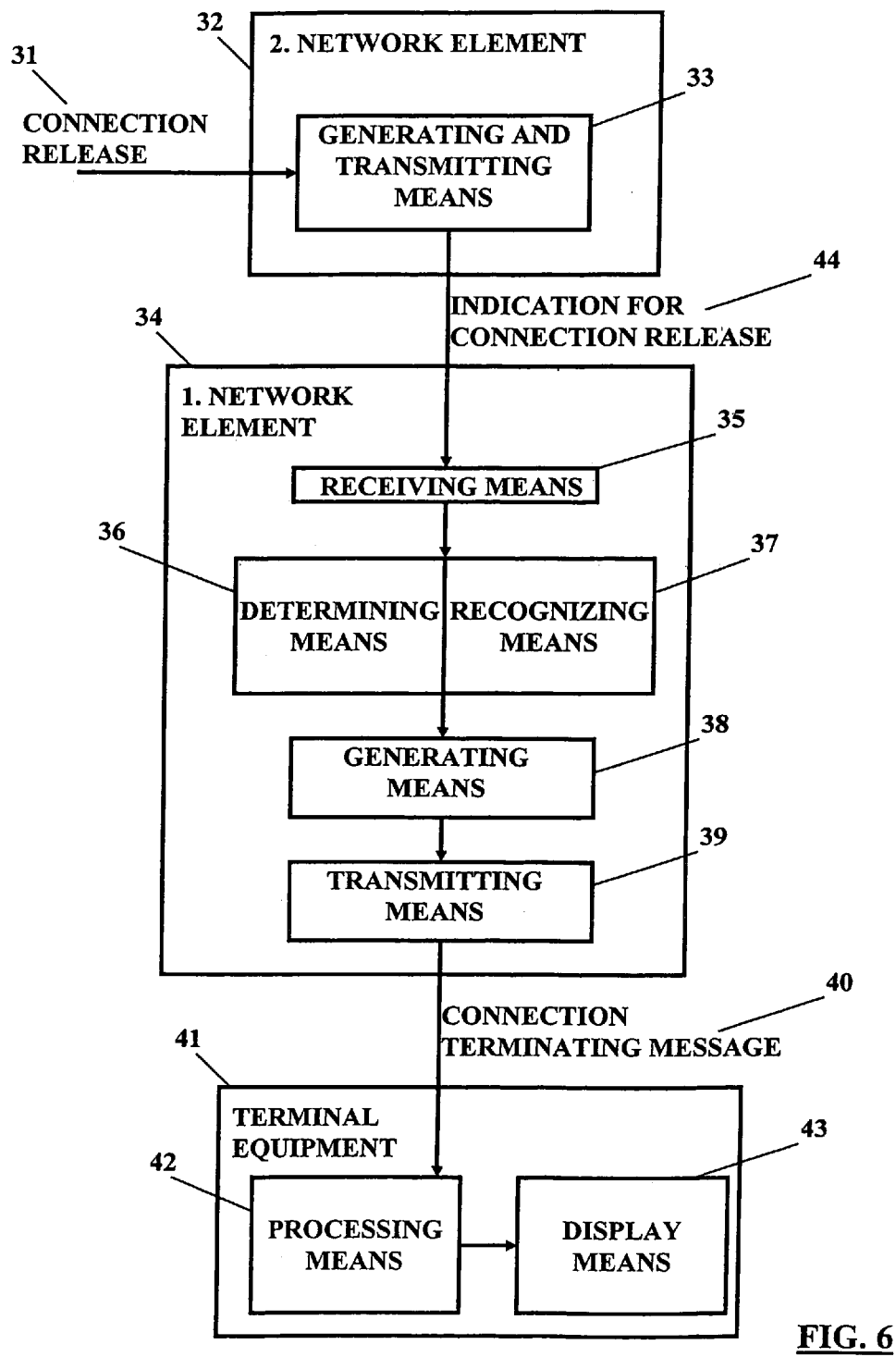
FIG. 6 shows a block diagram of a system for managing a connection release.

Referring to FIGS. 1 and 6, a general example of the connection managing mechanism according to the present invention is described.

In FIG. 1, a flow chart of a method of managing a connection release for an established connection is shown. In step S10, an indication for a release of the established connection is received by a first network element. The first network element is, for example, a session management network element like a P-CSCF in an IMS environment. The indication is transmitted, for example, from a second network element which is used as a policy decision element, like a PDF, or from a network control element, like a GGSN.

In step S20, it is determined in the first network element from the received indication, that the network release is caused by an unavailability of network resources for the established connection, e.g. by a loss of bearer. The determination may also comprise a separate recognition of information regarding the reason for the connection release.

In step S30, a connection terminating message is generated by the first network element which is used in the connection termination procedure and to be sent to the served party. In particular, an additional information element is included in the connection terminating message which provides information regarding the reason of the connection release (why is the connection terminated), i.e. which indicates, for example, the loss of bearer. The information element is, for example, a reason header introduced in a standard connection terminating message such as a SIP BYE message. The information element is derived from the processing (determination/recognition processing) in step S20.

Next, in step S40, the connection terminating message generated in step S30 is transmitted from the first network element to one or more of the involved parties of the connection to be terminated. At the party's terminal side, besides the usual processing of the connection terminating message for releasing the connection, the user terminal may also be adapted to process protocol information or text information included in the reason header in order to inform a user that the connection release is caused, for example, by a loss of bearer. However, due to the introduction of the reason header field in the usual structure of the connection terminating message, this information element may also be ignored by the party's terminal equipment. In other words, the way how the information element is handled by the terminal equipment is optional and can be specified by the terminal equipment manufacturer/vendor and/or the network provider.

In FIG. 6, a structure of a system/device usable for the connection release managing mechanism is shown. Reference sign 31 denotes a message sent to the second network element 32 which indicates the release of the established connection between at least two parties. The message 31 is transmitted, for example, from a communication control network element (not shown), such as a support node, via an interface connecting this communication control network element and the second network element 31.

The second network element comprises generating and processing means 33 adapted to generate the indication 44 for the release of the connection, which indication includes information regarding an unavailability of network resources, and to transmit this indication 44 to a first network element 34 via an interface connecting the second network element 32 and the first network element 34.

The first network element is adapted to receive the transmitted indication 44 by means of a receiving means 35. The first network element further comprises determining means 36, which includes recognizing means 37, to which the indication 44 is passed. In the determining means 36 and recognizing means 37 the received indication 44 is processed in such a way that the information regarding the unavailability of network resources is detected. Furthermore, the first network element comprises generating means 38 which generate a connection terminating message and utilizes the information regarding the unavailability of network resources derived in the determining means 36 for introducing an information element indicating the reason for the connection release, i.e. the loss of bearer, for example. The information element may be, for example, a reason header field which is included in the connection terminating message. Reference sign 39 denotes a transmitting means which is adapted to transmit the connection terminating message 40 to at least one of the parties of the connection to the released for executing a release procedure.

Reference sign 41 denotes a terminal equipment as one end point of the connection to be released, i.e. a terminal equipment of one party. Preferably, the terminal equipment 41 belongs to that party which is served by the first network element 34 in the connection management. The terminal equipment 41 receives the connection terminating message 40 from the first network element 34 and processes it in a processing means 42. The processing means 42 may be adapted to execute the connection release procedure, but it may also be adapted to process the information element indicating the reason for the connection release, which is introduced by the generating means 38 on the basis of the information regarding the unavailability of network resources. As a result of the processing by the processing means 42, an informing means such as a display means 43 is adapted to display information regarding the reason for the connection release to a user.

Figure 2:
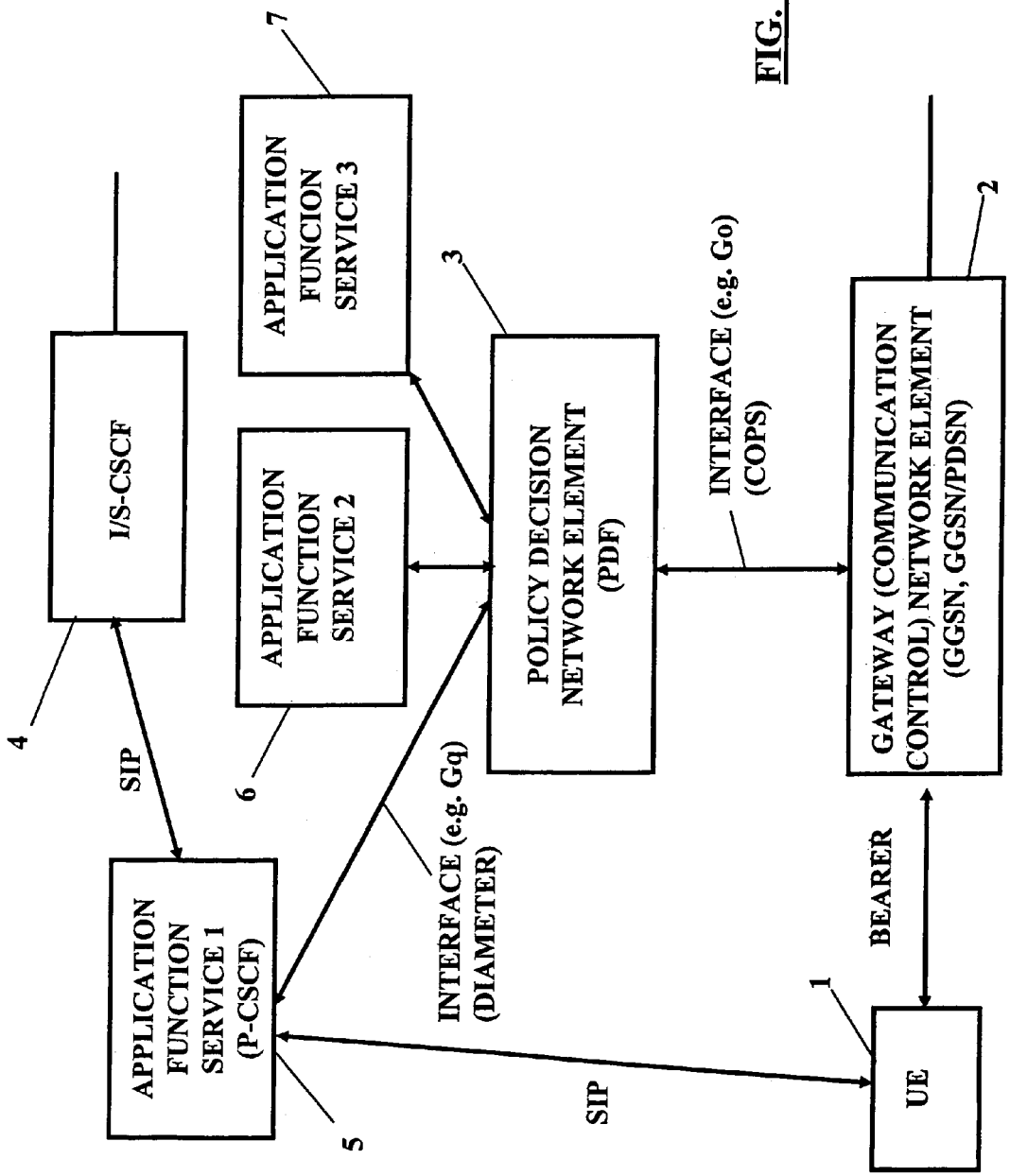
FIG. 2 shows a block diagram of a communication network using the mechanism for managing a connection release according to a first embodiment.
Figure 3:
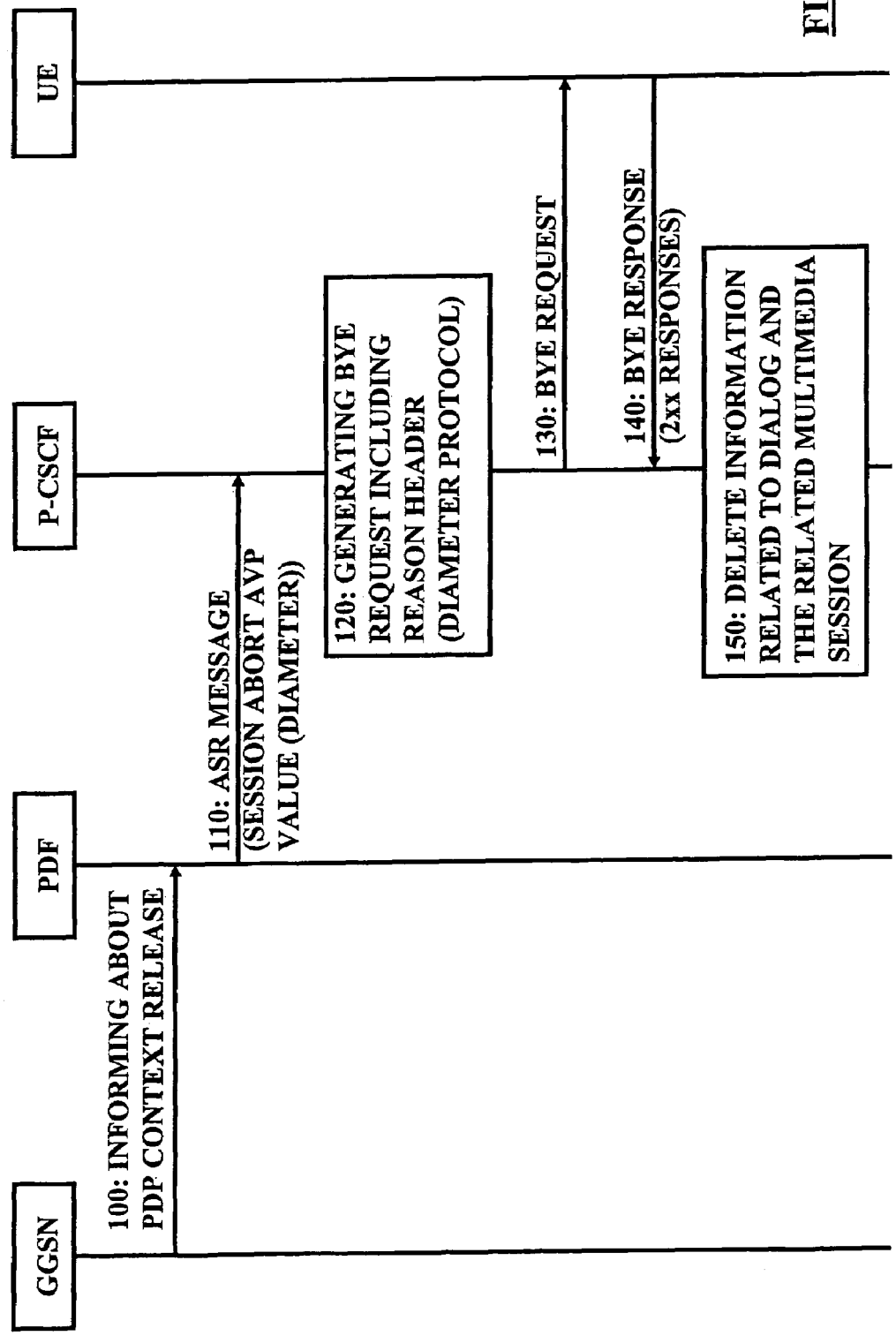
FIG. 3 shows a signaling diagram according to the first embodiment.

Next, with regard to FIGS. 2 and 3, an implementation of the connection release managing mechanism described above in an 3GPP IMS rel. 6 environment is shown. It is to be noted that an equivalent implementation may be used in case of a 3GPP2 MMD Rel-A environment.

In FIG. 2, the network structure of the 3GPP IMS rel. 6 environment is shown. Reference sign 1 denotes a user equipment (UE) representing an example for one party's terminal equipment participating on the connection to be released. Reference sign 2 denotes a communication control or gateway network element, such as a GGSN, GGSN/PDSN (Packet Data support node) and the like. It is to be noted that the latter example for the network element 2 is part of a 3GPP2 MMD network environment for which the measures defined in connection with the example of FIGS. 2 and 3 is applicable equivalently. The UE 1 and the network element 2 are connected via a bearer. However, as known by those skilled in the art, between the UE 1 and the gateway/communication control network element 2, several other network elements (not shown) are involved in the connection, such as access network subsystem elements and the like. As also shown in FIG. 2, the gateway/communication control element 2 provides a further line for the bearer connection towards the other party or parties of the session.

Reference sign 3 denotes a policy decision network element such as a PDF. The PDF 3 is connected with the gateway/communication control network element 2 via a Go interface. For signaling on the Go interface, COPS protocol is used in the present example.

Reference signs 5 to 7 denote application functions (AF) providing services and applications for IP Multimedia sessions of the UE 1. The AFs 5 to 7 are connected via respective Gq interfaces for exchanging service based policy information to the PDF 3. For signaling on the Gq interfaces, Diameter protocol is used in the present example. One if the AFs, i.e. AF 5, is a P-CSCF in the IMS environment serving the UE 1. The P-CSCF is connected by means of a SIP signaling with the UE 1 and with other call session control functions, like an I-CSCF or S-CSCF 4.

Next, referring to the signaling diagram of FIG. 3, the connection or session release management procedure according to the present example is described.

When the GGSN 2 detects that network resources for the session of the UE 1 are not available (anymore), e.g. the bearer used by the UE 1 for the session is lost, it informs the PDF 3 thereabout (100), for example by informing about a PDP context release via the Go interface. The PDF 3 becomes aware of the loss of bearer and sends a corresponding indication, such as a Abort Session Request (ASR) message 110 via the Gq interface by using Diameter protocol to the P-CSCF 5. In the ASR message, an appropriate Session-Abort-Cause AVP value is included. The ASR command, indicated by a Command-Code field set, for example, to "274" and the "R" bit set in the Command Flags field, is sent to the Application Function to inform it that the bearer resources are not available anymore.

Upon receipt of this indication that the radio interface resources are no longer available for a served user, for whom one or more ongoing session exists, the P-CSCF 5 performs a release procedure for releasing each of the related dialogs. For this purpose, as shown at reference sign 120, a connection terminating message is generated, for example a SIP BYE request, into which an information element, such as a Reason header field (RFC 3326), is included.

In detail, in case the P-CSCF 5 serves the calling user of a session it generates a BYE request based on information saved for the related dialog during the establishment of the session, including:

a Request-URI (Uniform Resource Identifier), set to a stored Contact header provided by the called user;

a To header (specifying the desired "logical" recipient of the request), set to the To header value as received in a 200 (OK) response for the initial INVITE request (received during the establishment of the session);

a From header (indicating the logical identity of the initiator of the request), set to the From header value as received in the initial INVITE request;

a Call-ID header (acting as a unique identifier to group together a series of messages), set to the Call-Id header value as received in the initial INVITE request;

a CSeq header (serving as a way to identify and order transactions), set to the CSeq value that was stored for the direction from the calling to the called user, incremented by one;

a Route header, set to the routeing information towards the called user as stored for the dialog.

the Reason header, set to 'Diameter' as the protocol value with '274' as the protocol cause, as the information element for informing about the reason for release;

further headers, based on local policy or the requested session release reason.

On the other hand, in case the P-CSCF 5 serves the called user of a session it generates a BYE request based on the information saved for the related dialog, including:

a Request-URI, set to the stored Contact header provided by the calling user;

a To header, set to the From header value as received in the initial INVITE request;

a From header, set to the To header value as received in the 200 (OK) response for the initial INVITE request;

a Call-ID header, set to the Call-Id header value as received in the initial INVITE request;

a CSeq header, set to the CSeq value that was stored for the direction from the called to the calling user, incremented by one—if no CSeq value was stored for that session it shall generate and apply a random number within the valid range for CSeqs;

a Route header, set to the routeing information towards the calling user as stored for the dialog;

a Reason header, set to 'Diameter' as the protocol value with '274' as the protocol cause, as the information element for informing about the reason for release;

further headers, based on local policy or the requested session release reason.

In the present example, the Reason header provided in the BYE message carries a Diameter cause code, as received from the PDF 3. As an example, the P-CSCF 5 may introduce the following Reason header field in the outgoing BYE request:

Reason: Diameter; cause=274; text="loss of bearer"

(where Reason means "protocol value" and Cause means "protocol cause" according to RFC 3588)

Indicated with reference sign 130, the so generated BYE request is sent from the P-CSCF 5 to towards the indicated user (according to the To header) by means of SIP signaling.

The user (i.e. the user equipment 1) receives the BYE request 130 and executes a release procedure for the session concerned. Then, the UE 1 sends a BYE response message 140 to the P-CSCF 5 including 2xx Responses according to SIP.

Upon receipt of the 2xx responses for the BYE request, as indicated with reference sign 150, the P-CSCF 5 deletes all information related to the dialog and the related multimedia session (which were previously stored during the establishment of the connection).

Optionally, the UE 1 may also execute, by a processing means, a further processing of the information included in the Reason header field for informing the user about the reason for the connection/session release (i.e. loss of bearer). This can be effected either by using the text information in the Reason header or by identifying the protocol information such as the protocol value and protocol cause when the UE 1 is aware of the Diameter protocol. Corresponding information can then be provided by informing means to the user, e.g. by displaying corresponding information on a display.

As noted above, the mechanism described in FIGS. 2 and 3 for the 3GPP IMS re. 6 environment is also equivalently applicable for a 3GPP2 MMD environment.

Figure 4:
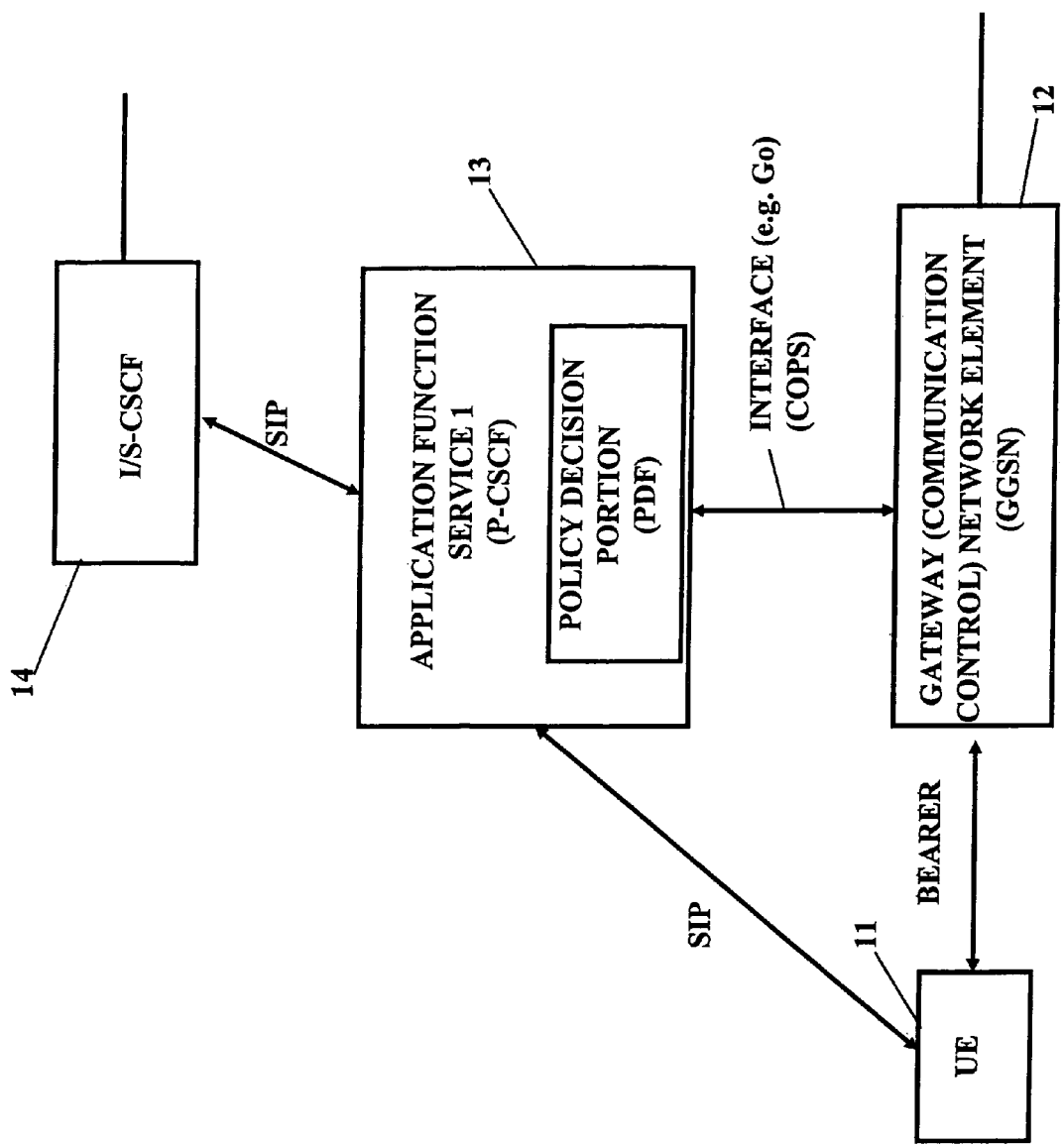
FIG. 4 shows a block diagram of a communication network using the mechanism for managing a connection release according to a second embodiment.
Figure 5:
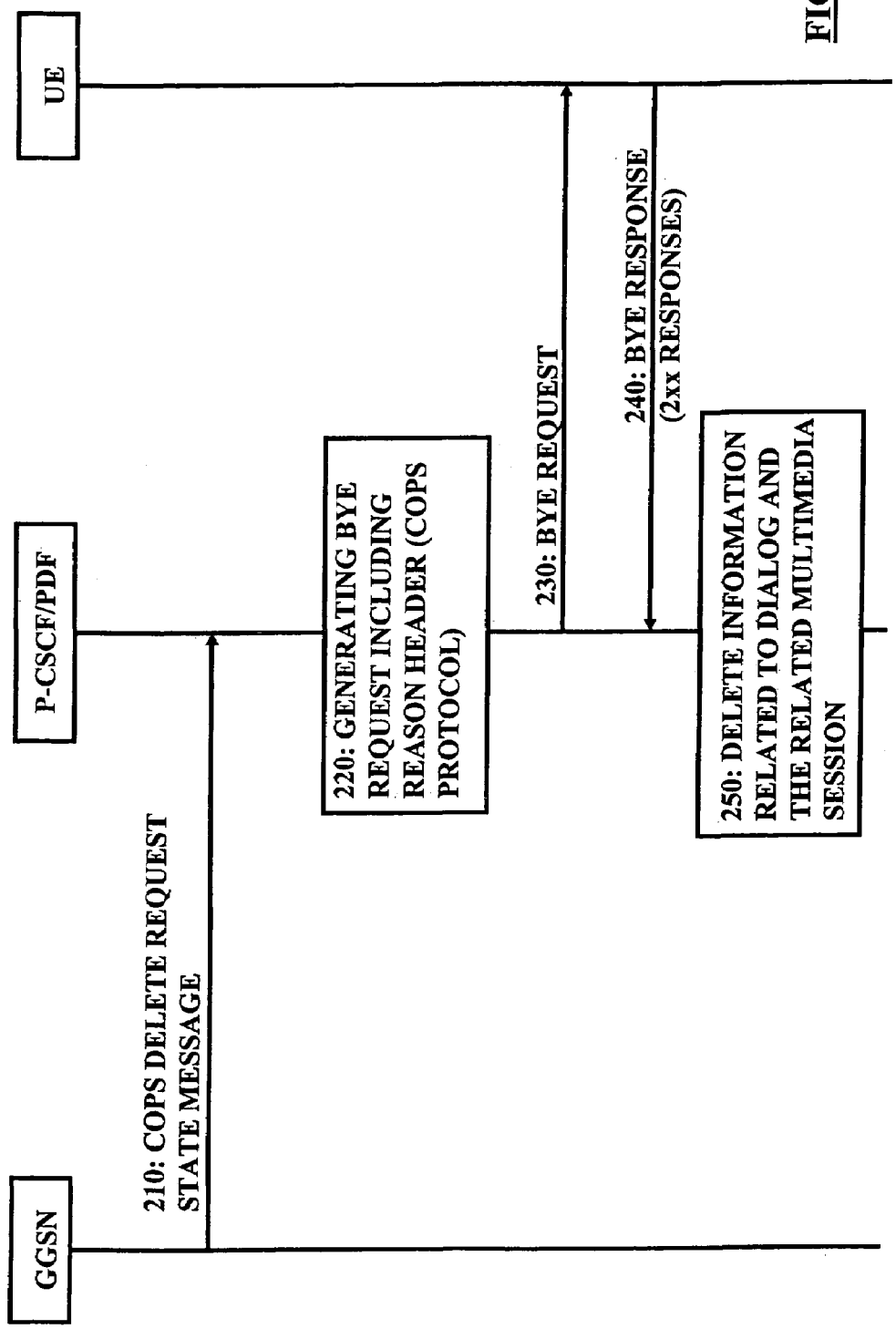
FIG. 5 shows a signaling diagram according to the second embodiment.

Next, with regard to FIGS. 4 and 5, a further example for an implementation of the connection release managing mechanism in an 3GPP IMS rel. 5 environment is shown.

In FIG. 4, the network structure of the 3GPP IMS rel. 5 environment is shown. Reference sign 11 denotes a user equipment (UE) representing an example for one party's terminal equipment participating on the connection to be released. Reference sign 12 denotes a communication control or gateway network element, such as a GGSN. The UE 11 and the network element 12 are connected via a bearer. However, as known by those skilled in the art, between the UE 11 and the gateway/communication control network element 12, several other network elements (not shown) are involved in the connection, such as access network subsystem elements and the like. As also shown in FIG. 4, the gateway/communication control element 12 provides a further line for the bearer connection towards the other party or parties of the session.

Reference sign 13 denotes an P-CSCF as an application function (AF) providing services and applications for IP Multimedia sessions of the UE 1, which comprises a policy decision portion such as a PDF. The P-CSCF/PDF 13 entity is connected with the gateway/communication control network element 21 via a Go interface. For signaling on the Go interface, COPS protocol is used in the present example.

It is to be noted that in 3GPP IMS rel. 5, also a structure may be provided in which the P-CSCF and the PDF are placed in separate network elements. However, in this case, the interface connecting these two elements is not specified.

The P-CSCF 13 is connected by means of a SIP signaling with the UE 11 and with other call session control functions, like an I-CSCF or S-CSCF 14.

Next, referring to the signaling diagram of FIG. 5, the connection or session release management procedure according to the present example is described.

When the GGSN 12 detects that network resources for the session of the UE 11 are not available (anymore), e.g. the bearer used by the UE 11 for the session is lost, it informs the P-CSCF/PDF 13 thereabout (210) via the Go interface. In other words, the GGSN 12 sends an indication about the loss of bearer, for example by means of a COPS Delete Request State (DRQ) message.

When receiving the indication, the P-CSCF/PDF 13 becomes aware of the loss of bearer. Upon receipt of this indication that the radio interface resources are no longer available for a served user, for whom one or more ongoing session exists, the P-CSCF/PDF 13 performs a release procedure for releasing each of the related dialogs. For this purpose, as shown at reference sign 220, a connection terminating message is generated, for example a SIP BYE request, into which an information element, such as a Reason header field (RFC 3326), is included.

In detail, in case the P-CSCF/PDF 13 serves the calling user of a session it generates a BYE request based on information saved for the related dialog during the establishment of the session, including:

a Request-URI (Uniform Resource Identifier), set to a stored Contact header provided by the called user;

a To header (specifying the desired "logical" recipient of the request), set to the To header value as received in a 200 (OK) response for the initial INVITE request (received during the establishment of the session);

a From header (indicating the logical identity of the initiator of the request), set to the From header value as received in the initial INVITE request;

a Call-ID header (acting as a unique identifier to group together a series of messages), set to the Call-Id header value as received in the initial INVITE request;

a CSeq header (serving as a way to identify and order transactions), set to the CSeq value that was stored for the direction from the calling to the called user, incremented by one;

a Route header, set to the routeing information towards the called user as stored for the dialog.

the Reason header, set to 'COPS' as the protocol value with 'DRQ' as the protocol cause, as the information element for informing about the reason for release;

further headers, based on local policy or the requested session release reason.

On the other hand, in case the P-CSCF/PDF 13 serves the called user of a session it generates a BYE request based on the information saved for the related dialog, including:

a Request-URI, set to the stored Contact header provided by the calling user;

a To header, set to the From header value as received in the initial INVITE request;
a From header, set to the To header value as received in the 200 (OK) response for the initial INVITE request;
a Call-ID header, set to the Call-Id header value as received in the initial INVITE request;
a CSeq header, set to the CSeq value that was stored for the direction from the called to the calling user, incremented by one—if no CSeq value was stored for that session it shall generate and apply a random number within the valid range for CSeqs;
a Route header, set to the routeing information towards the calling user as stored for the dialog;
a Reason header, set to 'COPS' as the protocol value with 'DRQ' as the protocol cause, as the information element for informing about the reason for release;
further headers, based on local policy or the requested session release reason.

In the present example, the Reason header provided in the BYE message carries a COPS cause code, as received from the GGSN 12. As an example, the P-CSCF/PDF 13 may introduce the following Reason header field in the outgoing BYE request:
Reason: COPS; cause=DRQ; text="loss of bearer"
(where Reason means "protocol value" and Cause means "protocol cause" according to RFC 2748)

Indicated with reference sign 230, the so generated BYE request is sent from the P-CSCF/PDF 13 to towards the indicated user (according to the To header) by means of SIP signaling.

The user (i.e. the user equipment 11) receives the BYE request 230 and executes a release procedure for the session concerned. Then, the UE 11 sends a BYE response message 240 to the P-CSCF/PDF 13 including 2xx Responses according to SIP.

Upon receipt of the 2xx responses for the BYE request, as indicated with reference sign 250, the P-CSCF/PDF 13 deletes all information related to the dialog and the related multimedia session (which were previously stored during the establishment of the connection).

Optionally, the UE 11 may also execute, by a processing means, a further processing of the information included in the Reason header field for informing the user about the reason for the connection/session release (i.e. loss of bearer). This can be effected either by using the text information in the Reason header or by identifying the protocol information such as the protocol value and protocol cause when the UE 11 is aware of the COPS protocol. Corresponding information can then be provided by informing means to the user, e.g. by displaying corresponding information on a display.

It is to be noted that in view of RFC 3326, protocol values and their associated protocol cause to be used with such a reason header field may be registered as

| Protocol Value | Protocol Cause | Reference |
|---|---|---|
| Diameter | 274 | RFC 3588 |
| COPS | DRQ | RFC 2748 |

As described above, the present invention relates to a method usable for managing a connection release of an established connection between two or more parties via a communication network. When the reason for terminating a connection/session between at least two parties is caused by circumstances in the communication network, such as a loss of bearer, this is detected in a first network element. Then the first network element generates a connection terminating message to be used in the connection release procedure into which a new information element is introduced indicating the reason for the connection release, for example the loss of bearer. This reason may be indicated to a user as an optional and additional information. Furthermore, a corresponding system, device and/or terminal equipment are proposed.

The invention claimed is:

1. A method comprising:
  managing at least one connection between at least two parties via a communication network, wherein when an established connection is to be released, the method comprises
  determining, in a proxy call session control function, an unavailability of radio resources for the established connection of a party; and
  generating, in the proxy call session control function, a connection terminating message to be sent to at least one of the at least two parties, wherein the connection terminating message is provided with an information element indicating a reason for a connection release and indicating the unavailability of radio resources, and includes a reason header field as the information element indicating the reason for the connection release, wherein the reason header field comprises a protocol information portion and a text portion understandable for a user and identifying the reason indicating the unavailability of radio resources,
  wherein the generating comprises generating the connection terminating message on the basis of
    a request identifier,
    a first information portion specifying a recipient of the request,
    a second information portion indicating the identity of the initiator of the request,
    a third information portion indicating a unique identifier to group together a series of messages,
    a fourth information portion identifying and ordering transactions set to the CSeq value that was stored for the direction from the calling to the called user, incremented by one, and
    a fifth information portion indicating routing information towards a party.

2. The method according to claim 1, wherein the determining further comprises:
  receiving, from a second network element, an indication for the connection release of the established connection; and
  recognizing from the indication received from the second network element an information regarding the unavailability of radio resources, wherein the information is used for deriving the reason for the connection release.

3. The method according to claim 1, wherein the two or more parties comprise respective user terminals, or a combination of one or more user terminals and one or more services provided by the communication network.

4. The method according to claim 1, wherein said determining comprises determining, in the proxy call session control function, an unavailability of resources for the established connection of a party.

5. The method according to claim 2, wherein said receiving comprises receiving, from a policy decision network element, an indication for the connection release of the established connection.

6. The method according to claim 2, further comprising transmitting from the second network element to the proxy call session control function the indication for the connection release of the established connection by a Diameter protocol signaling.

7. The method according to claim 1, wherein the proxy call session control function comprises a policy decision portion.

8. The method according to claim 2, wherein the second network element comprises one of a communication control and a gateway support network element.

9. The method according to claim 2, further comprising transmitting from the second network element to the proxy call session control function indication for the connection release of the established connection by a Common Open Policy Service (COPS) protocol signaling.

10. The method according to claim 1, wherein the unavailability of radio resources for the established connection is based on a bearer loss for the established connection.

11. A method comprising:
  receiving, in a terminal equipment, a connection terminating message from a proxy call session control function,
    wherein the proxy call session control function generates the connection terminating message on the basis of
      a request identifier,
      a first information portion specifying a recipient of the request,
      a second information portion indicating the identity of the initiator of the request,
      a third information portion indicating a unique identifier to group together a series of messages,
      a fourth information portion identifying and ordering transactions set to the CSeq value that was stored for the direction from the calling to the called user, incremented by one, and
      a fifth information portion indicating routing information towards a party,
  wherein the connection terminating message is provided with an information element indicating a reason for a connection release and indicating an unavailability of radio resources, and includes a reason header field as the information element indicating the reason for the connection release,
  wherein the reason header field comprises a protocol information portion and a text portion understandable for a user and identifying the reason of unavailability of radio resources;
  processing, in the terminal equipment, the connection terminating message;
  deriving from the information element provided in the connection terminating message the reason for the connection release; and
  displaying the text portion to a user of the terminal equipment for indicating the reason for the connection release and indicating the unavailability of radio resources.

12. An apparatus comprising:
  a proxy call session control function;
  a determiner configured to determine an unavailability of radio resources for an established connection of a party resulting in a release of the established connection; and
  a generator configured to generate a connection terminating message to be sent to at least one of at least two parties, wherein the generator is configured to provide the connection terminating message with an information element indicating a reason for a connection release and indicating an unavailability of radio resources, and to include a reason header field as the information element indicating the reason for the connection release, wherein the reason header field comprises a protocol information portion and a text portion understandable for a user and identifying the reason indicating the unavailability of radio resources,
  wherein the generator is further configured to generate the connection terminating message on the basis of
    a request identifier,
    a first information portion configured to specify a recipient of the request,
    a second information portion configured to indicate the identity of the initiator of the request,
    a third information portion configured to indicate a unique identifier to group together a series of messages,
    a fourth information portion configured to identify and order transactions set to the CSeq value that was stored for the direction from the calling to the called user, incremented by one, and
    a fifth information portion configured to indicate routing information towards a party.

13. The apparatus according to claim 12, further comprising:
  a receiver configured to receive, from a network element, an indication for the release of the established connection; and
  a recognizer configured to recognize from the indication received from the network element an information regarding the unavailability of radio resources, wherein the information is used to derive the reason for the connection release.

14. The apparatus according to claim 12, wherein the two or more parties comprise respective user terminals, or a combination of one or more user terminals and one or more services provided by the communication network.

15. The apparatus according to claim 13, wherein the receiver is configured to receive the indication for the release of the established connection from a policy decision network element.

16. The apparatus according to claim 13, wherein the receiver is configured to receive the indication for the release of the established connection by a Diameter protocol signaling.

17. The apparatus according to claim 12, wherein the apparatus is comprised in a network element comprising the proxy call session control function and a policy decision portion.

18. The apparatus according to claim 13, wherein the receiver is configured to receive the indication for the release of the established connection from one of a communication control and a gateway support network element.

19. The apparatus according to claim 13, wherein the receiver is configured to receive the indication for the release of the established connection by means of a Common Open Policy Service (COPS) protocol signaling.

20. The apparatus according to claim 12, wherein the unavailability of radio resources for the established connection determined by the determiner is based on a bearer loss for the established connection.

21. The apparatus according to claim 12, further comprising:
  a transmitter configured to transmit the connection terminating message to a terminal equipment.

22. An apparatus comprising:
  a receiver configured to receive a connection terminating message from a proxy call session control function,
    wherein the proxy call session control function is configured to generate the connection terminating message on the basis of
      a request identifier, a first information portion configured to specify a recipient of the request, a second information portion configured to indicate the identity of the initiator of the request, a third information portion configured to indicate a unique identifier to group together a series of messages, a fourth information portion configured to identify and order transactions set to the CSeq value that was stored for the direction from the calling to the called user, incremented by one, and a fifth information portion configured to indicate routing information towards a party, wherein the connection terminating message is provided with an information element indicating a reason for a connection release and indicating an unavailability of radio resources, and includes a reason header field as the information element indicating the reason for the connection release, wherein the reason header field comprises a protocol information portion and a text portion understandable for a user and identifying the reason of unavailability of radio resources;

a processor configured to process the connection terminating message and to derive, from an information element included in the connection terminating message, a reason for a connection release; and an informer configured to inform a user of the apparatus about the reason for the connection release supplied by the processor by using the text portion, wherein the informer comprises a display configured to display the text portion as an information indicating the reason for the connection release and indicating the unavailability of radio resources.

23. The apparatus according to claim 22, wherein the processor is configured to use at least one of the protocol information portion and the text portion identifying the reason for the connection release in the information element for deriving the reason for the connection release.

24. An apparatus comprising:

means for providing a proxy call session control function, determining means for determining an unavailability of radio resources for an established connection of a party resulting in a release of the established connection, and generating means for generating a connection terminating message to be sent to at least one of at least two parties, wherein the generating means provides the connection terminating message with an information element indicating a reason for a connection release and indicating an unavailability of radio resources and includes a reason header field as the information element indicating the reason for the connection release, wherein the reason header field comprises a protocol information portion and a text portion understandable for a user and identifying the reason of unavailability of radio resources, wherein the generating means generates the connection terminating message on the basis of a request identifier, a first information portion specifying a recipient of the request, a second information portion indicating the identity of the initiator of the request, a third information portion indicating a unique identifier to group together a series of messages, a fourth information portion for identifying and ordering transactions set to the CSeq value that was stored for the direction from the calling to the called user, incremented by one, and a fifth information portion indicating routing information towards a party.

25. An apparatus comprising:

receiving means for receiving a connection terminating message from a proxy call session control function, wherein the proxy call session control function generates the connection terminating message on the basis of a request identifier, a first information portion specifying a recipient of the request, a second information portion indicating the identity of the initiator of the request, a third information portion indicating a unique identifier to group together a series of messages, a fourth information portion identifying and ordering transactions set to the CSeq value that was stored for the direction from the calling to the called user, incremented by one, and a fifth information portion indicating routing information towards a party, wherein the connection terminating message is provided with an information element indicating a reason for a connection release and indicating an unavailability of radio resources, and includes a reason header field as the information element indicating the reason for the connection release, wherein the reason header field comprises a protocol information portion and a text portion understandable for a user and identifying the reason of unavailability of radio resources;

processing means for processing the connection terminating message and for deriving, from an information element included in the connection terminating message, a reason for a connection release;

informing means for informing a user of the apparatus about the reason for the connection release supplied by the processor by using the text portion; and display means for displaying the text portion as an information indicating the reason for the connection release and indicating the unavailability of radio resources.

26. A method comprising:

managing an establishment of at least one connection between at least two parties via a communication network, wherein when a connection can not be established, the method comprises determining, in a proxy call session control function, an unavailability of radio resources for the establishment of the connection; and generating, in the proxy call session control function, a connection terminating message to be sent to at least one of the at least two parties, wherein the connection terminating message is provided with an information element indicating a reason for a connection release and indicating an unavailability of radio resources, and includes a reason header field as the information element indicating the reason for the connection release, wherein the reason header field comprises a protocol information portion and a text portion understandable for a user and identifying the reason of indicating the unavailability of radio resources, wherein the generating comprises generating the connection terminating message on the basis of a request identifier,
a first information portion specifying a recipient of the request,
a second information portion indicating the identity of the initiator of the request,
a third information portion indicating a unique identifier to group together a series of messages,
a fourth information portion identifying and ordering transactions set to the CSeq value that was stored for the direction from the calling to the called user, incremented by one, and
a fifth information portion indicating routing information towards a party.

27. An apparatus comprising:
a proxy call session control function;
a determiner configured to determine an unavailability of radio resources for an establishment of a connection between at least two parties, resulting in that the connection can not be established; and
a generator configured to generate a connection terminating message to be sent to at least one of at least two parties, wherein the generator is configured to provide the connection terminating message with an information element indicating a reason for a connection release and indicating an unavailability of radio resources, and to include a reason header field as the information element indicating the reason for the connection release, wherein the reason header field comprises a protocol information portion and a text portion understandable for a user and identifying the reason indicating the unavailability of radio resources,
wherein the generator is further configured to generate the connection terminating message on the basis of
a request identifier,
a first information portion configured to specify a recipient of the request,
a second information portion configured to indicate the identity of the initiator of the request,
a third information portion configured to indicate a unique identifier to group together a series of messages,
a fourth information portion configured to identify and order transactions set to the CSeq value that was stored for the direction from the calling to the called user, incremented by one, and
a fifth information portion configured to indicate routing information towards a party.

28. An apparatus comprising:
means for providing a proxy call session control function;
determining means for determining an unavailability of radio resources for an establishment of a connection between at least two parties, resulting in that the connection can not be established; and
generating means for generating a connection terminating message to be sent to at least one of at least two parties, wherein the generating means provides the connection terminating message with an information element indicating a reason for a connection release and indicating an unavailability of radio resources, and includes a reason header field as the information element indicating the reason for the connection release, wherein the reason header field comprises a protocol information portion and a text portion understandable for a user and identifying the reason indicating the unavailability of radio resources,
wherein the generating means generates the connection terminating message on the basis of
a request identifier,
a first information portion specifying a recipient of the request,
a second information portion indicating the identity of the initiator of the request,
a third information portion indicating a unique identifier to group together a series of messages,
a fourth information portion for identifying and ordering transactions set to the CSeq value that was stored for the direction from the calling to the called user, incremented by one, and
a fifth information portion indicating routing information towards a party.

29. A computer-readable medium encoding a computer program, the computer program configured to control a processor to perform a method comprising:
managing at least one connection between at least two parties via a communication network, wherein when an established connection is to be released, the method comprises
determining, in a proxy call session control function, an unavailability of radio resources for the established connection of a party; and
generating, in the proxy call session control function, a connection terminating message to be sent to at least one of the at least two parties, wherein the connection terminating message is provided with an information element indicating a reason for a connection release and indicating the unavailability of radio resources, and includes a reason header field as the information element indicating the reason for the connection release, wherein the reason header field comprises a protocol information portion and a text portion understandable for a user and identifying the reason indicating the unavailability of radio resources,
wherein the generating comprises generating the connection terminating message on the basis of
a request identifier,
a first information portion specifying a recipient of the request,
a second information portion indicating the identity of the initiator of the request,
a third information portion indicating a unique identifier to group together a series of messages,
a fourth information portion identifying and ordering transactions set to the CSeq value that was stored for the direction from the calling to the called user, incremented by one, and
a fifth information portion indicating routing information towards a party.

30. A computer-readable medium encoding a computer program, the computer program configured to control a processor to perform a method comprising:
receiving, in a terminal equipment, a connection terminating message from a proxy call session control function, wherein the proxy call session control function generates the connection terminating message on the basis of
a request identifier,
a first information portion specifying a recipient of the request,
a second information portion indicating the identity of the initiator of the request,
a third information portion indicating a unique identifier to group together a series of messages, a fourth information portion identifying and ordering transactions set to the CSeq value that was stored for the direction from the calling to the called user, incremented by one, and a fifth information portion indicating routing information towards a party, wherein the connection terminating message is provided with an information element indicating a reason for a connection release and indicating an unavailability of radio resources, and includes a reason header field as the information element indicating the reason for the connection release, wherein the reason header field comprises a protocol information portion and a text portion understandable for a user and identifying the reason of unavailability of radio resources;

processing, in the terminal equipment, the connection terminating message;

deriving from the information element provided in the connection terminating message the reason for the connection release; and displaying the text portion to a user of the terminal equipment for indicating the reason for the connection release and indicating the unavailability of radio resources.

31. A computer-readable medium encoding a computer program, the computer program configured to control a processor to perform a method comprising:

managing an establishment of at least one connection between at least two parties via a communication network, wherein when a connection can not be established, the method comprises determining, in a proxy call session control function, an unavailability of radio resources for the establishment of the connection; and generating, in the proxy call session control function, a connection terminating message to be sent to at least one of the at least two parties, wherein the connection terminating message is provided with an information element indicating a reason for a connection release and indicating an unavailability of radio resources, and includes a reason header field as the information element indicating the reason for the connection release, wherein the reason header field comprises a protocol information portion and a text portion understandable for a user and identifying the reason of indicating the unavailability of radio resources, wherein the generating comprises generating the connection terminating message on the basis of a request identifier, a first information portion specifying a recipient of the request, a second information portion indicating the identity of the initiator of the request, a third information portion indicating a unique identifier to group together a series of messages, a fourth information portion identifying and ordering transactions set to the CSeq value that was stored for the direction from the calling to the called user, incremented by one, and a fifth information portion indicating routing information towards a party.

* * * * *